United States Patent

[11] 3,572,630

| [72] | Inventor | Edward V. Mendenhall |
| --- | --- | --- |
|  |  | Del Mar, Calif. |
| [21] | Appl. No. | 819,043 |
| [22] | Filed | Apr. 24, 1969 |
| [45] | Patented | Mar. 30, 1971 |
| [73] | Assignee | Climate Conditioning Corporation |
|  |  | Stanton, Calif. |

[54] IRRIGATION SLIDE GATE VALVE AND SYSTEM
4 Claims, 2 Drawing Figs.

[52] U.S. Cl.................................................. 251/145,
137/320, 61/12
[51] Int. Cl...................................................E02b 13/00,
F16k 3/316
[50] Field of Search............................................ 251/145,
146, 147, 326, 347, 353; 137/320, 322; 61/12

[56] References Cited
UNITED STATES PATENTS
| 2,881,010 | 4/1959 | Bouma.......................... | 251/146X |
| 3,107,684 | 10/1963 | Hix............................... | 61/12X |
| 3,159,172 | 12/1964 | Baxter.......................... | 251/145X |

*Primary Examiner*—William R. Cline
*Attorney*—Christie, Parker & Hale

ABSTRACT: A high strength-to-weight ratio plastic is used in the fabrication of an irrigation slide gate valve system which includes a water distribution pipe or conduit, slide gate valves and a riser. The riser is capped. The slide gate valves include a slide which is coupled through a mounting base to the riser. The slides have spouts which are selectively positionable over water passages in the mounting bases to produce metered flow from the riser. An O-ring in each mounting base urges against each slide to effect a seal and keep the slides in their desired positions. The slides are coupled to the mounting bases through spaced apart and facing flanges of the slides which are received in complementary slots or tracks in the mounting bases.

Patented March 30, 1971

3,572,630

INVENTOR.
EDWARD V. MENDENHALL

BY
Christie, Parker & Hale
ATTORNEYS

IRRIGATION SLIDE GATE VALVE AND SYSTEM

BACKGROUND OF THE INVENTION

This invention relates to an irrigation system and, more particularly, to an improved slide gate valve for use in irrigation systems.

Present irrigation systems employ vertical concrete risers joined to concrete distribution pipes or conduits. Each riser, through an adjustable valve, opens into a concrete pot having a plurality of gate valves. The distribution piping, risers and pots are joined by concrete grout.

When the valve between the riser and pot is opened, water flows by gravity from the distribution line to the riser and into the pot. The gate valves in the pot, in turn, control the flow of water to the areas being irrigated.

The construction of these known irrigation systems is expensive and plagued by maintenance.

Initially, the gate valves which control the flow of water from the pots to the areas being irrigated are in the form of thin metallic plates slidably received in metallic frames anchored to the concrete pots. The metallic construction makes the gate valves susceptible to corrosion and abrasion. Moreover, the gate valves are prone to impact damage which can cause seizure, or at least difficulty, in positioning the slidable plate. In addition, metering of water flow through the gate valves if often difficult because of corrosion and abrasion, and their inherent tendency to be either too loose or too tight.

The concrete construction of prior art irrigation systems causes failure from such agencies as internal and external pressures on the system's components, earth movement and impact from field equipment such as tractors. The maintenance of these systems is also compounded because of the frequency of leakage from the grouted joints between individual distribution pipes, distribution pipes and risers, and risers and pots.

The installation expense of concrete irrigation systems is high because of the weight of their individual components and the large number of joints which must be grouted. Moreover, individual components are relatively expensive to purchase.

Another problem confronting prior art irrigation systems is in the difficulty of maintaining desired head throughout the system. Head must be maintained at desired levels to prevent exceeding the burst strength of the distribution pipes. The problem in maintaining proper head is occasioned by the difficulty in providing cross-sectional area variations in concrete pipes. Because of this, head adjustment is frequently effected by expensive and troublesome stand pipes spaced through the system.

SUMMARY OF THE INVENTION

The present invention contemplates an improved slide gate valve and system which includes a base mounting member for a riser emanating from a conduit and a slide for controlling water flow from the riser urged by sealing means into a preselected position.

In one form, the slide gate valve has a water passage through the mounting base for communication with water in the riser and a hole in the slide for discharge of water at a desired location. The hole in the slide, which may be defined by the bore of a spout, is selectively positionable over the water passage to vary the discharge rate of the water. Alternately, the slide can be moved such that an inner surface thereof cooperates with the sealing means to terminate water flow.

In specific form, the present invention contemplates that the riser be capped, inasmuch as the slide gate valve is capable of withstanding considerable head in the irrigation system. Thus, there is no need for a main control valve between the conduit and the riser. A handle may be also be provided on the slide for ease of its positioning.

Preferably, the slide is attached or carried by the mounting base through a pair of cooperating flanges received in slots in the mounting bore and which extend inwardly towards the water passage. The flanges are parallel to each other and to the plane of sliding movement of the slide. Sidewalls between the slide proper and the flanges provide for the attachment of the flanges to the slide. The seal means, preferably in the form of a standard O-ring disposed in a circumferential channel in the mounting base, urges against the contiguous surface of the slide to pull the flanges into contact with a wall of slots and thereby provide a holding force for the selective positioning of the slide and, therefore, metering of water from the riser.

In order to provide ease of installation, corrosion and abrasion resistance, strength and easy head adjustment, it is preferred that the components of the improved slide gate valve and irrigation system be fabricated from a high strength-to-weight ratio plastic.

These and other features, aspects and advantages of the present invention will become more apparent from the following description, appended claims and drawings.

DESCRIPTION OF THE PREFERRED EMBODIMENTS

Figures 1, 2:
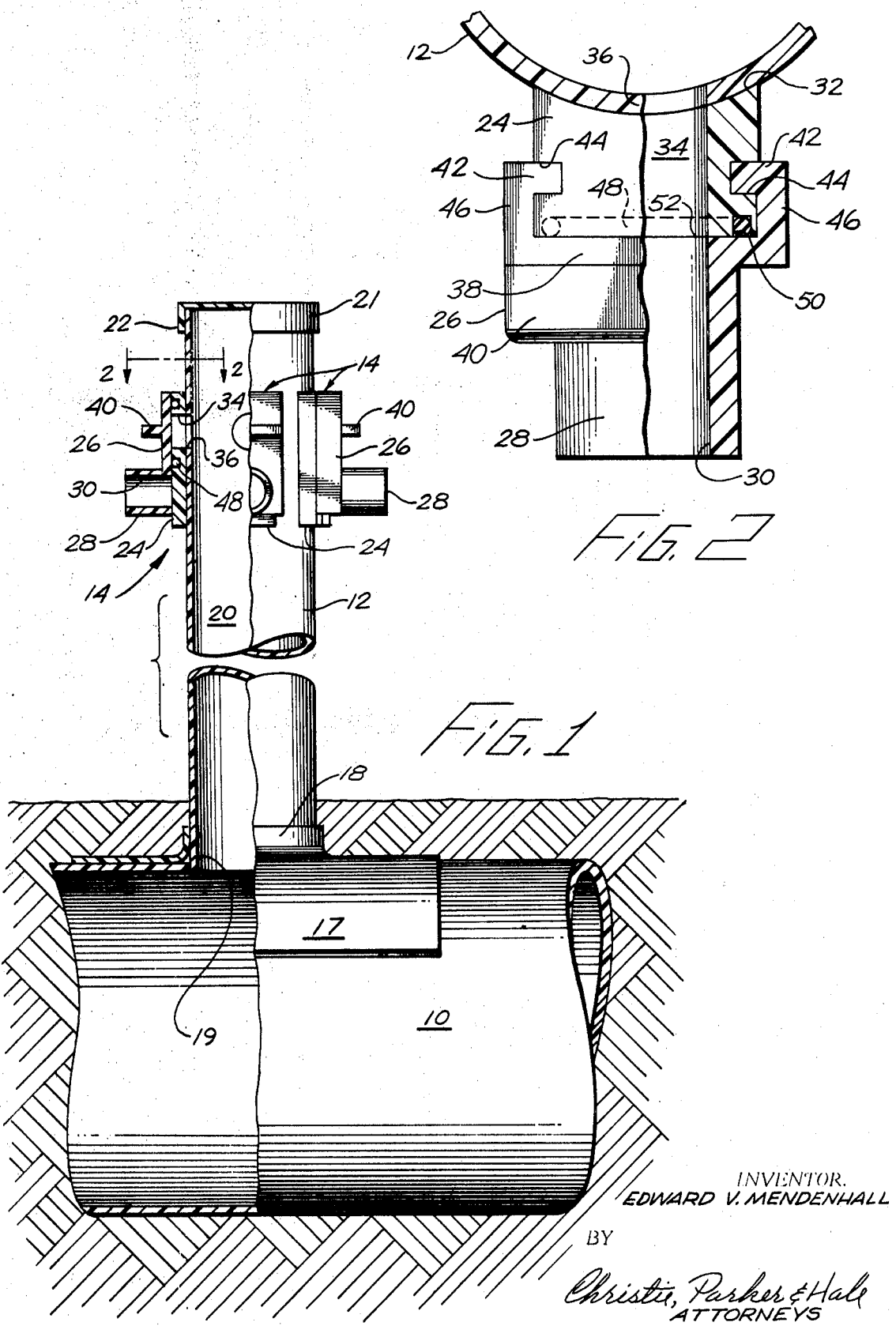
FIG. 1 is a view, partly in cross section, of the irrigation slide gate valve system of the present invention.
FIG. 2 is a top view, partly in section, taken generally along line 2–2 of FIG. 1.

FIG. 1 illustrates the improved irrigation slide gate valve and system of the present invention. In general, the illustrated system includes a water distribution conduit 10, a riser 12 and a plurality of slide gate valves 14.

Each of the slide gate valves is integral with the riser and is capable of independent, selective actuation and adjustment from the other gate valves to suit the demands of the particular areas being irrigated.

The water distribution conduit or pipe is shown buried in the ground with the riser emanating from the pipe to an aboveground location.

The riser, water conduit and slide gate valves are fabricated from high strength-to-weight ratio thermoplastic or thermosetting plastics. The plastic construction affords the flexibility of different conduit diameters for head adjustment. Moreover, plastic construction enhances the integrity of the irrigation system because it substantially resists joint leakage and disturbances from, for example, earth tremors and equipment impact.

The riser is joined to the conduit through a conduit and riser coupling 16.

Coupling 16 includes an annular upstanding flange 18 which receives the riser and surrounds a hole 19 in the conduit. The riser is received in hole 19 and terminates at the inner wall of the conduit to present an unobstructed entrance into riser 12. The riser is secured to flange 18 by a solvent weld between the contiguous surfaces of the two. The flange is integral with a contoured attachment base 18a which fits over the cylindrical surface of the water distribution conduit. The riser is secured to the pipe or conduit by a solvent weld between the contiguous surfaces of the attachment base and conduit.

Riser 12, which is the form of a cylindrical pipe having a hollow interior 20 for the passage of water, is capped or covered by cap 21. This cap is solvent-welded to the riser between an annular, downward depending flange 22 of the cap and a contiguous outer cylindrical surface of the riser. It is possible to cap the riser because slide gate valves 14 are capable of resisting water pressure within the riser without leakage. Thus, the necessity for an open pot for controlling a main control valve between a riser and the pot, as is attendant in the prior art, is dispensed with.

The irrigation slide gate valves are affixed in a desired array to the the outside of the riser.

Each irrigation slide gate valve 14 generally includes a mounting base 24 for receiving a slide 26. Each slide has an integrally formed spout 28 which defines a bore or passage 30. Passage 30 extends completely through the slide to the mounting base. Each mounting base 24 is permanently affixed to the outside surface of riser 12 as by solvent welding between an interior surface 32 of the base and a contiguous riser surface. Each mounting base has a water passage 34 which is coaxial with a radial port 36 in the wall of the riser.

Each slide 26 has a base portion 38 which is generally flat and includes a portion of passage 30, and from which spout 28 extends generally normal to the plane of the base. Each slide also has a handle 40 above the spout and extending normal from base portion 38 in position for moving the slide on mounting base 24. Each slide is coupled to its mounting base to effect controlled positioning of passage 30 in spout 28 with respect to water passage 34 of the mounting base and to prevent leakage along the interface between the slide and the base member. The controlled positioning effects metered water flow through the the spout.

The coupling of each slide 26 to its associated mounting base 24 is produced through a pair of opposed flanges 42 which face each other and are slidably received in vertical slots 44 in the mounting bases. Each flange 42 is integrally connected to base portion 38 through a side portion 46. The pair of side portions for each slide is integral with the slide's base portion 38. The flanges and slots are parallel to the plane of movement of the slide, that is, the plane of the interface between the slide and the mounting base. This parallelism is to maintain the seal provided by the O-ring illustrated, and the slight position maintaining force exerted by the O-ring and water pressure on the slide and transferred to the walls of the slots by the flanges.

For the purpose of effecting a seal and holding the slides in a selected position with respect to the mounting bases, each mounting base receives an O-ring 48. The O-rings surrounded water passage 34 in the mounting bases. Each O-ring is disposed in an annular channel 50 of standard configuration to receive an O-ring. Each O-ring bears in sealing relationship against a contiguous area of an interior surface 52 of each slide's base portion 38. The O-rings provide a seal from water leakage out of passage 34 along the interface between each slide and its associated base member. Each O-ring also applies a slight loading force to the slide to augment any frictional engagement present between inwardly extending flanges 42 and the walls of the slots 44 of each mounting base. Thus the O-rings serve to retain the slides with the mounting bases in a desired position.

In operation, each irrigation slide gate valve may be closed by simply pushing down on handle 40 to position passage 30 of the its spout 28 below O-ring 48 and thereby provide a seal. When it is desired to open the irrigation slide gate valve, the handle is merely lifted upward until the desired flow issues from spout 28. As was previously mentioned, there is a slight force exerted by the O-rings which tends to force slides 26 somewhat tightly against the outer vertical wall in mounting bases 24 which define slots 44. This slight pressure allows for the positioning of each slide 26 at a desired location on the base member. Thus, accurate metering of water from spout 28 is possible.

I claim:

1. An improved irrigation slide gate valve system comprising:
   a. a water distribution conduit;
   b. a capped riser communicating the conduit to a desired water distribution location; and
   c. a slide gate valve for discharging water from the riser including:
      i. a mounting base on the riser having a water passage with an inlet in communication with the interior of the riser and an outlet opening at an exterior the riser surface of the mounting base;
      ii. a slide having a spout with a bore therethrough opening exteriorly of the slide and at an inner surface thereof, the inner surface being of sufficient area to mask the water passage;
      iii. means attaching the slide to the mounting base with the inner surface of the slide facing the exterior surface of the mounting base for sliding movement in response to an external force on the slide to selectively communicate the water passage in the mounting base with the hole in the slide and to otherwise mask the water passage with the inner surface of the slide; and
      iv. seal means circumscribing the water passage outlet for preventing water leakage along the interface between the slide and the mounting base and urging against the slide to cooperate with the attaching means to maintain a preselected position of the slide with respect to the water passage, the seal means including an O-ring disposed in an annular channel in the mounting base and urging against the inner surface of the slide; whereby, the slide may be moved into a preselected position with the water passage in the mounting base and the hole in the slide communicated a selected amount for metered flow through the hole in the slide.

2. The improved irrigation slide gate valve system claimed in claim 1 wherein the attaching means includes:
   a. a slot in each of two parallel sides of the mounting base, the slots being parallel; and
   b. a flange on the slide for each slot, the flanges being disposed in the slots.

3. The improved irrigation slide gate valve system claimed in claim 2 wherein the slide includes:
   a. a generally flat base portion, the inner surface of the slide being on the base portion;
   b. the spout extending normal to the base portion;
   c. each of the flanges being connected to the base portion through a side portion of the slide which side portion extends over the associated side of the mounting base having the slot in which the flange is disposed; and
   d. a handle on the base portion for selectively moving the slide.

4. The improved irrigation slide gate valve claimed in claim 3 wherein the water distribution conduit, riser and slide gate valve are fabricated from high strength-to-weight ratio plastic.

PO-1050
(5/69)

UNITED STATES PATENT OFFICE
CERTIFICATE OF CORRECTION

Patent No. __3,572,630__     Dated __March 30, 1971__

Inventor(s) __Edward V. Mendenhall__

It is certified that error appears in the above-identified patent and that said Letters Patent are hereby corrected as shown below:

In the specification: Column 1, line 49 "through" should be --throughout--.

In the claims: Claim 1, column 4, line 11, after "exterior" delete "the riser".

Signed and sealed this 2nd day of November 1971.

(SEAL)
Attest:

EDWARD M. FLETCHER, JR.    ROBERT GOTTSCHALK
Attesting Officer    Acting Commissioner of Pater